United States Patent [19]

Engelsmann et al.

[11] 4,350,420

[45] Sep. 21, 1982

[54] CAMERA WITH FLASH UNIT

[75] Inventors: Dieter Engelsmann, Unterhaching; Dieter Maas, Baldham; Kurt Zattler; Herbert Schultes, both of Munich, all of Fed. Rep. of Germany

[73] Assignee: AGFA-Gevaert Aktiengesellschaft, Leverkusen, Fed. Rep. of Germany

[21] Appl. No.: 169,927

[22] Filed: Jul. 17, 1980

[30] Foreign Application Priority Data

Oct. 4, 1979 [DE] Fed. Rep. of Germany ....... 2940301

[51] Int. Cl.³ .............................................. G03B 15/05
[52] U.S. Cl. ..................................... 354/145; 354/126
[58] Field of Search ........................ 354/126, 145, 288

[56] References Cited

U.S. PATENT DOCUMENTS

| | | | |
|---|---|---|---|
| 4,072,970 | 2/1978 | Winkler | 354/288 X |
| 4,166,680 | 9/1979 | Maitani | 354/126 |
| 4,231,645 | 11/1980 | Davis et al. | 354/145 |
| 4,261,658 | 4/1981 | Uchiyama et al. | 354/126 |

*Primary Examiner*—John Gonzales
*Attorney, Agent, or Firm*—Michael J. Striker

[57] ABSTRACT

A still camera has a generally L-shaped electronic flash unit permanently mounted on it. The flash unit can pivot between an upright operative position and a substantially horizontal inoperative position in which its flash head is located above the camera lens mount and the unit forms an integrated part of the housing.

12 Claims, 9 Drawing Figures

CAMERA WITH FLASH UNIT

BACKGROUND OF THE INVENTION

This invention relates to cameras in general, and to a camera with a flash unit in particular.

Still more specifically, the invention relates to a photographic camera having an electronic flash unit.

Cameras to which electronic flash units can be detachably connected, are well known. It is also known to provide cameras with built-in electronic flash units. These prior-art constructions are all functional, but they also have various drawbacks. For example, attaching and detaching of a separate flash unit is often cumbersome, the unit may be in detached condition at the moment a flash exposure is required or the user may even have forgotten to take the unit along with the camera. Cameras in which the flash unit is built in are often relatively large and cumbersome to use, the flash unit is sometimes so constructed and installed as to form a foreign factor in the overall design appearance of the camera, and the flash unit often cannot be installed far enough away from the optical axis of the camera to avoid the so-called "redeye" effect.

SUMMARY OF THE INVENTION

It is, accordingly, an object of the present invention to overcome the prior-art disadvantages.

A more particular object is to provide an improved camera and electronic flash unit combination, wherein the flash unit is well integrated into the overall appearance and structure of the camera, so as not to be disturbing to the user in its inoperative position.

Another object is to provide a combination of the type just mentioned in which the flash unit can rapidly and in a very simple manner be displaced between its operative and inoperative positions.

A further very important object is to provide such a camera and flash unit combination in which the flash-producing component is far enough removed from the optical axis—when the flash unit is in operative position—to avoid occurrence of the "redeye" effect.

In pursuance of these and still other objects which will become apparent hereafter, one feature of the invention resides in a camera with an electronic flash unit which, briefly stated, may comprise a camera housing having two contiguous sides located in mutually inclined planes; and a flash unit of generally L-shaped outline and including a supporting part and a head part which is provided with a reflector, the flash unit being mounted on the housing for pivotal movement between an operative position in which the supporting part projects upwardly of the housing and the reflector of the head faces forwardly of the housing, and an inoperative position in which at least some surfaces of the supporting part and head part face and abut against the two contiguous sides.

The camera housing has two sides which face the flash unit in the inoperative position of the same, namely the upper side and the front side of the housing. According to a further concept of the invention at least one of these sides is provided with regions cooperating with a portion of the flash unit; for example, with a depression in which a portion of the flash unit can be received when the flash unit is in its inoperative position.

It is advantageous if the flash unit is so constructed and installed that when it is in its inoperative position, its front or upper part will become located at or in front of the lens mount of the camera. In such a construction the flash unit is readily accessible but is, in its inoperative position, so located as to be no hindrance to the camera user. This facilitates the operation of the camera. According to still another concept of the invention that surface of the flash unit which in its inoperative position faces forwardly of the camera may, in this position, be coplanar with the front end face of the lens mount.

The camera housing may be provided, at its front side, with a projecting portion at or on which the upper part of the flash unit becomes located when in inoperative position. The edge faces of the projecting portion are preferably flush with the upper flash unit part when the flash unit is in this position, so that the flash unit and camera housing then constitute an integrated assembly. Aside from this, such an arrangement has the further advantages of saving space and having the flash unit located in a very easily accessible position.

Surfaces of the camera housing and of the flash unit which are located closely adjacent one another in the inoperative position of the flash unit, are advantageously provided with a magnetic latch to hold the flash unit against unintended movement out of the inoperative position. It is immaterial whether an appropriate surface of the flash unit carries a small permanent magnet and the co-operating housing surface carries a magnetizable member, or vice versa. The respective member may, of course, also be provided on the lens mount, if desired.

The upper part of the flash unit and the projecting portion (if any) of the housing are advantageously provided with inclined surfaces.

Although the flash unit can be mounted on the camera housing in any suitable manner, it is advantageous to mount the unit for pivoting movement in two lugs or bosses provided on the upper side of the camera housing. If it is desired for the camera to have a low overall height, the upper side of the housing may be provided with a recess into which the lower part of the flash unit enters when the unit assumes its inoperative position.

The lower part of the flash unit may be provided with a compartment for some or all of the batteries required to operate the flash unit and, if desired, also to operate other electrical camera components. A switch may be interposed in the electrical flash circuit and be mounted in the camera in such a manner that its operating member (e.g., a spring-loaded plunger) is actuated by some portion of the flash unit when the unit is moved to inoperative position, thereby interrupting the circuit until the unit is moved back to operating position. In the event the batteries in the unit serve also to supply other components in the camera, a separate electrical connection not controlled by the aforementioned switch is provided between the batteries and these other components.

It is also advantageous to provide the pivot joints in which the flash unit pivots, with detents or analogous components which hold the flash unit in its operative and inoperative positions, respectively, so as to keep it from performing unintended movements. Furthermore, means may be provided which are controlled by movement of the flash unit to the operative position thereof and which control the operation of other camera components, e.g., to automatically set the shutter and/or diaphragm for flash exposures, to energize an indicator visible in the viewer which announces flash readiness of the camera, or the like.

The lower part of the flash unit may be composed of two shell parts which define with one another the battery compartment.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
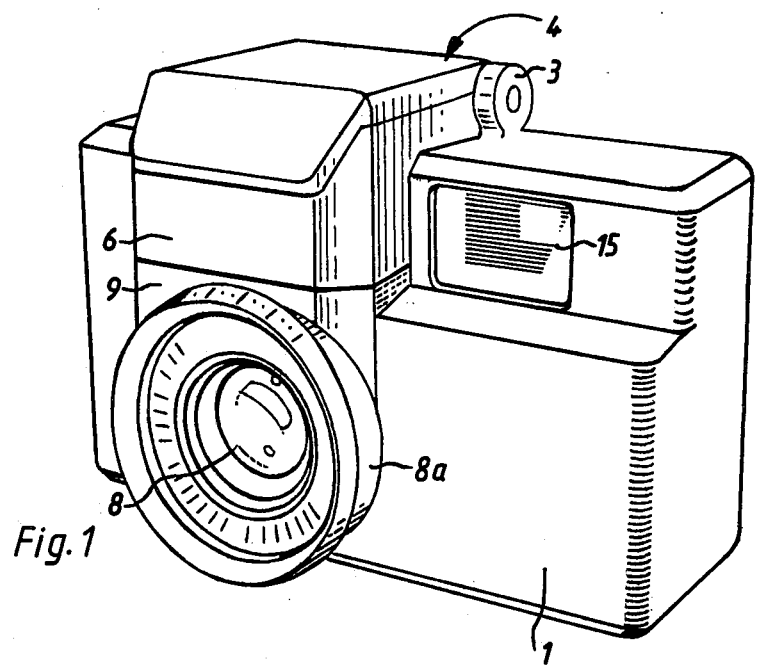
FIG. 1 is a front perspective view of a camera in accordance with one embodiment of the invention, with the flash unit shown in the inoperative position.
Figure 2:
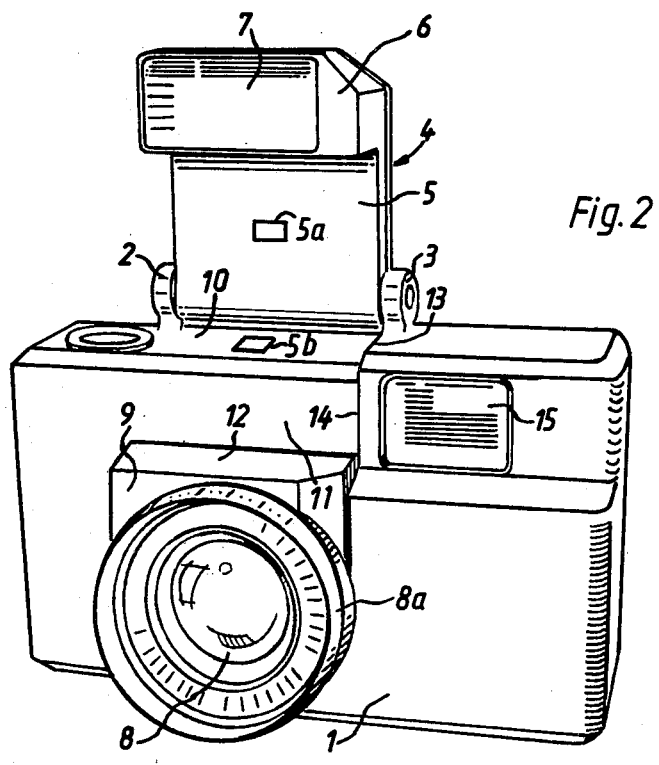
FIG. 2 shows the camera of FIG. 1 with the flash unit in its operative position.
Figure 3:
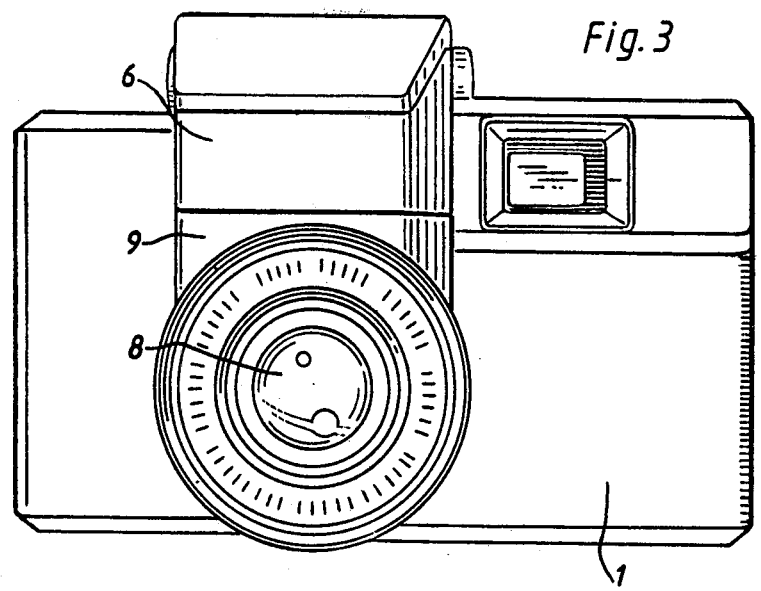
FIG. 3 is a front elevation of the camera in the position shown in FIG. 1.
Figure 4:
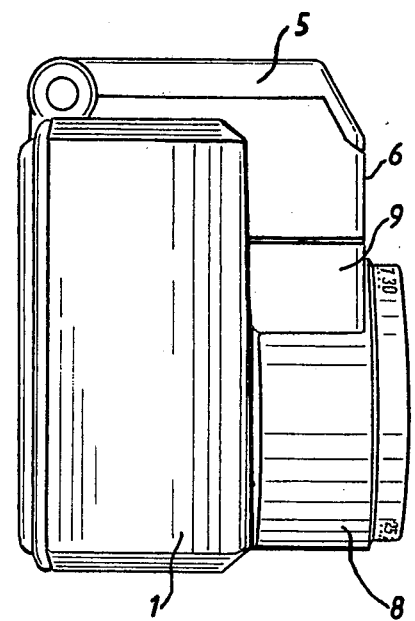
FIG. 4 is a side elevation of the camera shown in FIG. 3.

In the embodiment of FIGS. 1-4 the housing of a camera is identified with reference numeral 1. The upper side of the housing has raised lugs or bosses 2, 3 in which an electronic flash unit 4 is journalled for pivoting movement between an inoperative position (FIGS. 1, 3, 4) and an operative position (FIG. 2). The flash unit 4 is of generally L-shaped configuration and has a lower part 5 (pivoted at 2, 3) and an upper part or head 6. The head carries a diffuser screen 7 behind which the usual reflector and flash tube (not shown) are located.

The front side of the housing is provided with a tubular lens mount 8a holding the lens 8, and with a projecting part 9 having a width—as considered in direction from one to the other lateral side of the housing—which corresponds substantially to the diameter of the lens mount 8a.

When the flash unit 4 is in its inoperative position, the inner side of the lower part 5 (i.e., the side which faces the viewer of FIG. 2) rests on the top surface 10 of the housing 1 whereas the inner side (in FIG. 2 the downwardly facing side) of the head 6 abuts the front surface of the housing 1. The shape of projection 9 and of its upper surface 12 (FIG. 2) is so chosen that when the flash unit 4 is in closed position the cooperating surfaces of flash unit and projection 9 are flush with one another, i.e., they merge without steps (compare FIGS. 1, 3 and 4) so that the flash unit 4 is integrated into the housing outline. The upper surface 10 and the front surface 11 of the housing are stepped at 13 and 14, respectively, so that at the side towards the view finder 15 the flash unit 4 is partly recessed when in its inoperative position; this reduces the height and depth of the camera housing. The inner side of part 5 may carry a small permanent magnet 5a and the surface 10 a magnetizable member 5b (or vice versa) to hold the flash unit in its inoperative position against accidental movement to operative position.

Figure 5:
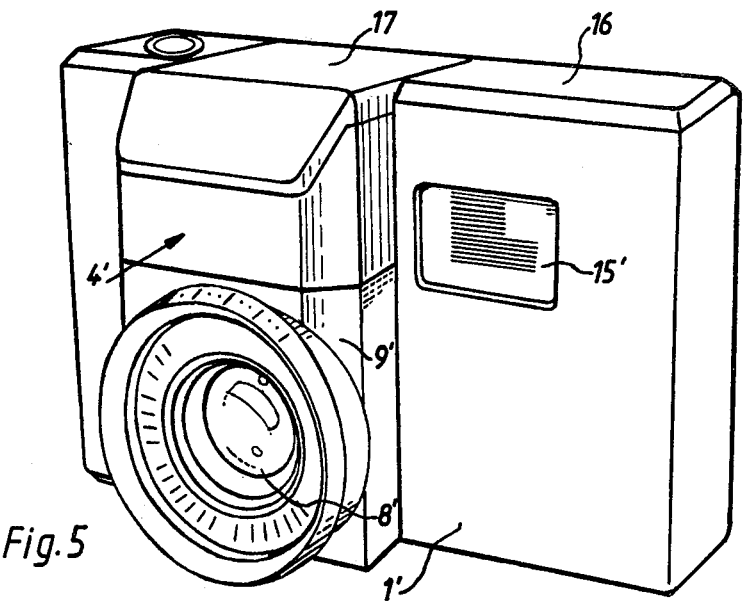
FIG. 5 is a view similar to FIG. 1, but illustrating a different embodiment.
Figure 6:
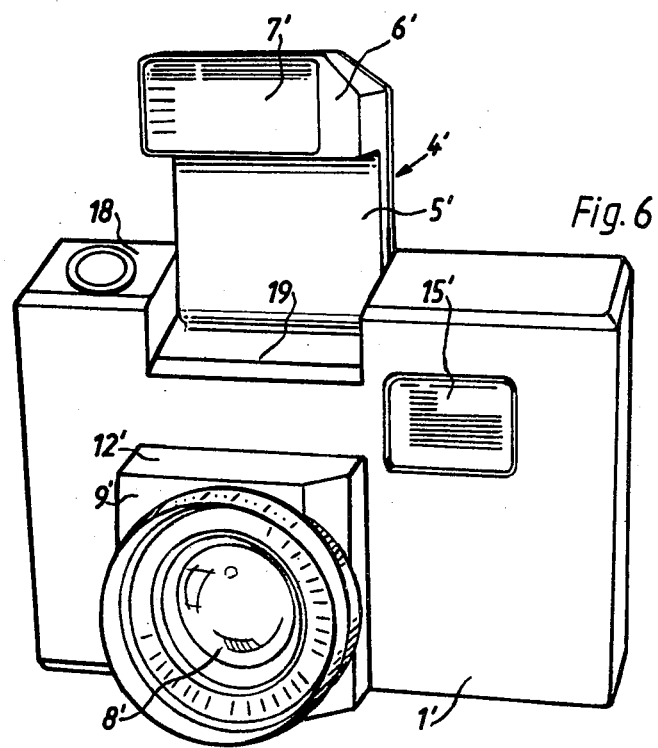
FIG. 6 shows the camera of FIG. 5 with its flash unit in operating position.

In the embodiment of FIGS. 5 and 6 the elements similar to those of FIGS. 1-4 are identified with the same reference numerals, but provided with a prime symbol. The difference in the two embodiments resides mainly in the fact that the upper side of housing 1' is sufficiently recessed at 19 for the upper surface 17 of the flash unit 4' to be flush with the upper surface 16 of the camera housing, when the flash unit is in its inoperative position. The bosses 2, 3 of FIG. 1 are omitted and the unit 4' is pivotally journalled in, e.g., the side walls bounding the recess 19.

Figure 7:
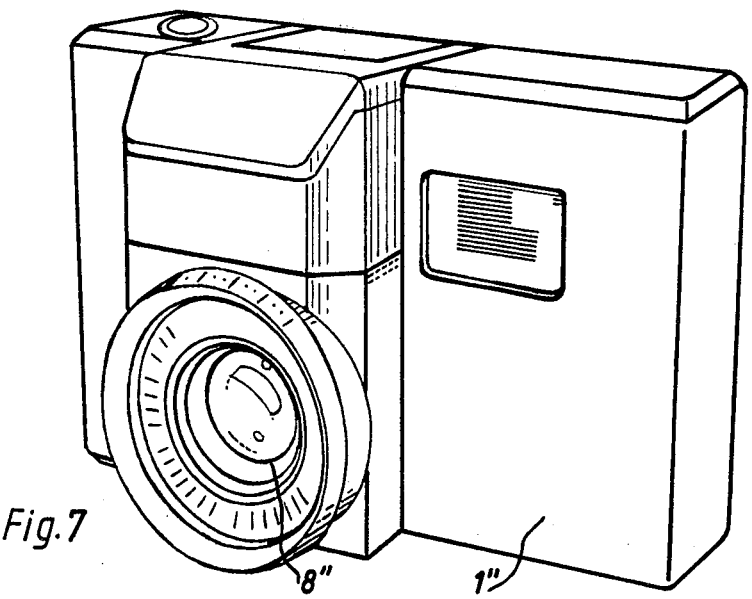
FIG. 7 is a view similar to FIG. 5 but showing still another embodiment of the invention.
Figure 8:
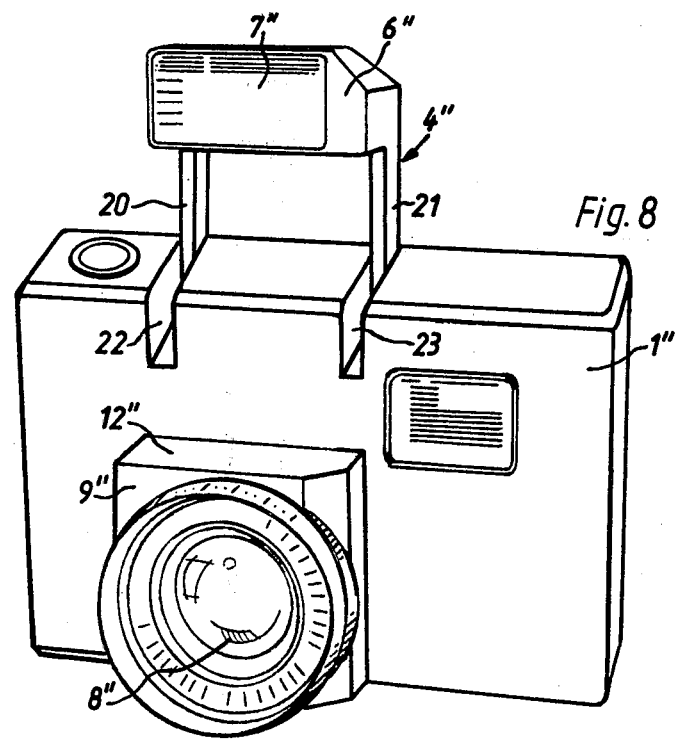
FIG. 8 shows the camera of FIG. 7 with its flash unit in operating position.

In FIGS. 7 and 8 the elements similar to those in FIGS. 1-4 are again provided with identical reference numerals, but this time double prime symbols are appended. This embodiment resembles the one in FIGS. 5-6, except that the lower portion of the flash unit 4" is not in form of a casing but is constituted by two arms 20, 21 which carry the head 6" and are pivotable in slots 22, 23 of the camera housing. The pivot connection of arms 20, 21 to the housing is here located in the interior of the housing 1".

Figure 9:
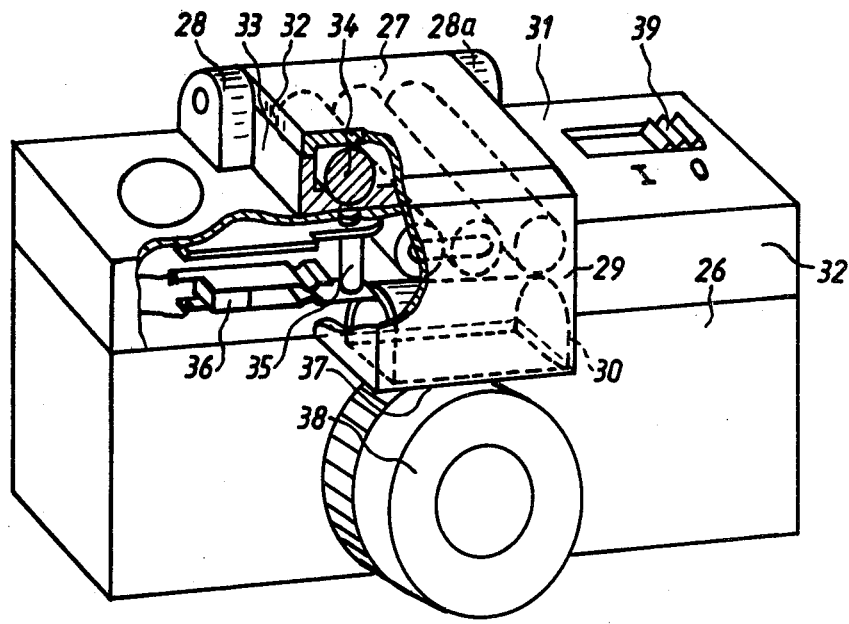
FIG. 9 shows a camera according to yet another embodiment of the invention, partly broken away and partly in section.

The embodiment in FIG. 9, finally, has a camera housing 26 provided at its upper side with lugs or bosses 28, 28a in which an electronic flash unit 27 is pivotably journalled. The shape of the flash unit 27 is of L configuration, as in the preceding embodiments. A head 29 of the unit accommodates the usual reflector 30 and, in the inoperative position of the unit, is located in front of a portion of the front side of camera housing 26; the lower part of the flash unit then lies on the upper side 31 of the camera housing.

This lower part of the unit 27 is composed of two mating shell sections 32, 33 which define with one another a compartment for batteries 34. A switch 36 is installed in camera housing 26 and interposed in the energizing circuit of the unit 27. A pin 35 extends out of the housing 26 and is displaced inwardly thereof against spring bias, when the lower part of unit 27 overlies the upper side 31. On being thus inwardly displaced the pin 35 opens the switch 36 to interrupt the circuit until the unit 27 is pivoted up to operative position.

In the inoperative position of the flash unit its end face 37 is located directly above the lens mount 38. The top end face of the head 29 of the flash unit is then coplanar with the front face of the lens mount 38.

A slide switch on the camera housing 39 serves to control the supply of electrical energy from batteries 34 to user-components in the camera. No circuitry is shown because this is known per se.

While the invention has been illustrated and described as embodied in a still camera, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a photographic camera a combination comprising a housing, a flash unit and a projecting lens unit, said housing having an axis which extends perpendicularly of an optical axis of said lens unit and two contiguous sides located in approximately perpendicular planes, said flash unit being of generally L-shaped outline, said flash unit being formed with a supporting part and a head part carrying a reflector, said flash unit being mounted on said housing for pivotal movement between an operative position in which said supporting part projects upwardly of said housing and extends along said housing axis and inoperative position in which at least some surfaces of said supporting part and head part abut against said two contiguous sides in the area of said lens unit and lockingly engage with said sides.

2. A combination as defined in claim 1, said lens unit having a free end face; and wherein said head part has another free end face, said end faces being coplanar when said flash unit is in said inoperative position thereof.

3. A combination as defined in claim 1, one of said sides being a front side of said housing and including a projecting section bounded by respective side faces, said head part of said flash unit being located adjacent said projecting section in said inoperative position of the flash unit and having edge faces which are flush with respective ones of said side faces.

4. A combination as defined in claim 1, one of said surfaces carrying a first member and one of said sides carrying a second member, one of said members being a permanent magnet and the other member being of magnetizable material so that said flash unit is retained in said inoperative position against accidental displacement by cooperation of said members.

5. A combination as defined in claim 1; and further comprising bosses provided on one of said sides which is an upper side of said housing, said flash unit being pivotally mounted in said bosses.

6. A combination as defined in claim 1, one of said sides being the upper side of said housing and provided with a depression and said supporting part of said flash unit being at least in part recessed in said depression when said flash unit is in said inoperative position.

7. A combination as defined in claim 1, said supporting part bounding a chamber adapted to accommodate electrical batteries.

8. A combination as defined in claim 1, said flash unit including an electronic firing circuit; further comprising a switch interposed in said firing circuit, and a member positioned to be depressed when said flash unit is moved to said inoperative position and is being depressed to open said switch and interrupt said firing circuit.

9. A combination as defined in claim 1, one of said sides being a front side of the housing, said lens unit being tubular, and wherein said flash unit has a width in direction parallel to said front side which is substantially equal to the diameter of said tubular lens unit.

10. A combination as defined in claim 1, wherein said at least some surfaces have respective shapes corresponding to the shapes of the respective sides.

11. A combination as defined in claim 1, said head part having a free end face, said end face pivoting toward said lens unit in said pivotal movement to said inoperative position.

12. A combination as defined in claim 1, one of said sides being a front side of said housing, said front side including a projecting section, said head part being engaged with said projecting section in said inoperative position of said flash unit, said head part and said projecting section having respective surfaces which abut one against another in said inoperative position.

* * * * *